Jan. 9, 1968 M. O. HALFHILL ET AL 3,363,182

SINGLE OSCILLATOR CLOCK CIRCUIT

Filed July 13, 1964

INVENTORS.
MARTIN O. HALFHILL
HAROLD C. STEPHENS

BY

Robert B. Crouch
ATTORNEY

United States Patent Office 3,363,182
Patented Jan. 9, 1968

3,363,182

SINGLE OSCILLATOR CLOCK CIRCUIT

Martin O. Halfhill and Harold C. Stephens, San Jose, Calif., assignors to International Business Machines Corporation, New York, N.Y., a corporation of New York Filed July 13, 1964, Ser. No. 381,993
4 Claims. (Cl. 328—63)

The present invention relates to a clock circuit and more particularly to a circuit for generating a sequence of clock pulses for timing the flow of data to and from a magnetic data storage file.

In digital magnetic recording the data is encoded according to a suitable code and then recorded in a timed sequence in a data storage file in the form of pulse representations or bits. When the data bits are recorded on, or read from the file, they are gated by, and thus synchronized with, a sequence of clock pulses. In rotating files (drums or disks) it is common practice to have a number of equally spaced clock pulse representations disposed in a closed track on the file. As the file is rotated, the clock pulses are sensed by a transducer and then employed to gate the flow of data. It is also known to produce the sequence of clock pulses by pulse generating means, such as multivibrators or oscillators, operating extennally of the file.

Clock tracks work satisfatcorily when the data transducers are fixed relative to the data tracks, so that each transducer remains in precise registry with its associated data track. However, when the transducers are movable to cooperate with a number of different tracks it becomes practically impossible to mechanically maintain precise registry on successive positionings of a transducer to a given track, so that errors are introduced in the data clocking. The use of external clock pulse generators avoids the problem encountered in clock tracks, but the application of such generators has been limited by the inherent characteristics of the circuit components available. In this respect the inherent inaccuracy of multivibrators restricts their use to recording systems which operate at very low data rates. L/C oscillators, however, being inherently more accurate than multivibrators, are suitable for high data rates, but the inherently slow recovery times of L/C oscillators introduce an additional problem which has hitherto been overcome only by the addition of further expensive circuitry.

The object of the present invention is to provide an improved clock circuit for generating a stable sequence of clock pulses and one which operates with accuracy and economy over a wide range of data rates.

The above object is realized in the present invention by the provision of a clock rircuit which includes a gated L/C oscillator operated at a frequency equal to twice the desired data rate, means for resynchronizing the oscillator with each data bit read from the file, and means for dividing the oscillator output to provide a stable sequence of clock pulses at the desired data rate.

Figure 1:
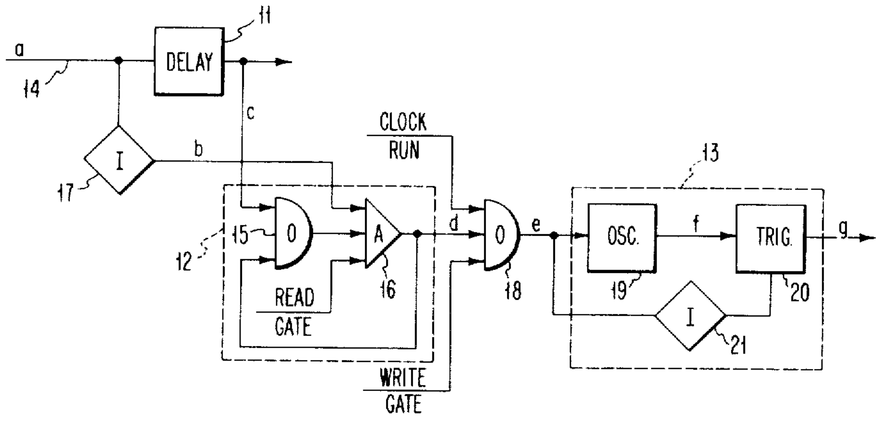
Figure 2:
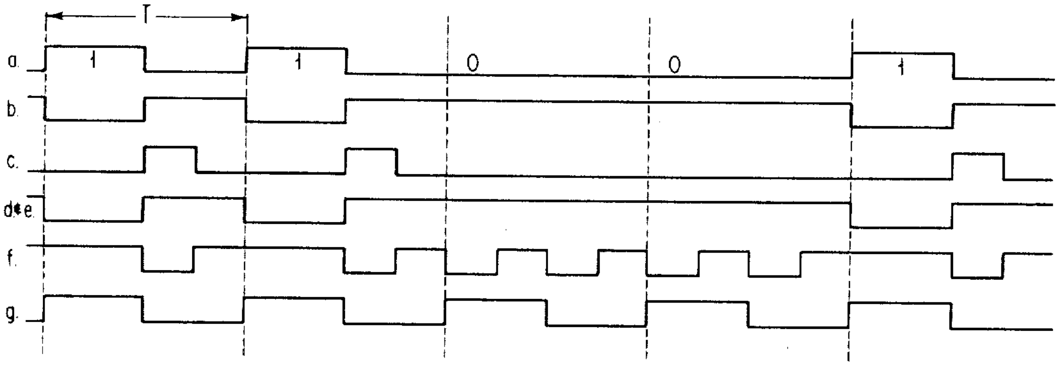

Other objects and many of the attendant advantages of this invention will be readily appreciated as the same becomes better understood by reference to the following detailed description of a preferred embodiment of the invention as illustrated in the accompanying drawings wherein:

FIG. 1 is a schematic diagram of the logical circuitry employed in the present invention; and FIG. 2 shows a series of waveforms illustrating the relationship of signals in the different portions of the circuit of FIG. 1.

The clocking circuit of the present invention, as depicted in FIG. 1, consists in essence of a delay circuit 11, a latch 12, and a clock 13. The delay circuit, which in practice may be a single shot multivibrator, is connected to a data line 14 which supplies raw read data from a rotating file (not shown). The latch 12, which is connected to the data line and to the delay circuit, is made up of a positive logical OR gate 15 plus a three input logical AND gate 16. The OR gate 15 is connected to the output of the delay circuit, while AND gate 16 is connected to the output of OR gate 15 and through an inverter 17 to the data line ahead of the delay circuit. A logical OR gate 18 is connected in series with the latch and the clock 13 to permit selective operation of the clock for various file functions. The clock 13 includes an L/C oscillator 19 in series with a binary trigger 20, the oscillator output being connected to the input of the trigger while the output of OR gate 18 is connected through an inverter 21 to the reset of the trigger.

Normally, a gated oscillator requires one full period for recovery after having been turned off, and any attempt to turn the oscillator on before it is fully recovered will result in a change of the output delay and may change the time of the oscillator's first period. In the past, two matched oscillators have been needed for clocking circuits. In such circuits the oscillators have been alternately selected and turned off with the synchronizing data bits. This has resulted in one oscillator always being off and fully recovered before the next data bit was applied to the clock.

The present invention offers a novel solution to the requirements of a clocking circuit. The problem of oscillator recovery time, which affects the first period and delay of the clock during rapid resynchronization is surmounted by operating the gated oscillator at twice the desired clock frequency or data rate. The recovery time for the oscillator thus becomes one-half of the clock period (one oscillator period). Therefore, if the delay of circuit 11 of FIG. 1 is equal to or greater than the oscillator period, the clock will always be fully recovered for any configuration of data bits. The delay produced by delay circuit 11, as well as allowing the oscillator to fully recover, also allows the clock circuit to "clock" the maximum amount of bit shift. In order to clock the maximum bit shift, this delay is normally found to be equal to or slightly greater than one-half the clock period. Therefore, maximum bit shift can be clocked and the oscillator recovery problem solved with only one delay circuit and one L/C oscillator, if the oscillator is operated at twice the clock frequency. Inasmuch as the oscillator frequency is twice the desired clock frequency, frequency division is performed with the binary trigger 20 to produce a stable sequence of clock signals at the desired clock frequency.

Referring to the waveforms of FIG. 2, waveform *a* is an idealized representation of the raw read data from the file for a bit pattern of 11001. The data is encoded such that a 1 bit is indicated by a positive pulse and a 0 bit is indicated by the absence of a pulse. Waveform *b* is the inverse of waveform *a*, i.e., the level of waveform *b* is high when that of waveform *a* is low and vice versa. Waveform *c* shows the data signal of *a* which has been delayed one-half clock period. In FIG. 2 the clock period is indicated at T, i.e., the time interval between the vertical dashed lines. The delayed data signal *c* is applied to positive OR gate 15 and the positive going pulse is passed by the OR gate and provided as one input to the three input AND gates 16. Another input to AND gate 16 is the read gate signal which is raised whenever it is desired to read data from the file. The third input to AND gate 16 is the inverted data signal *b*. When the three inputs to AND gate 16 are up, the output signal (waveform *d*) from the AND gate is likewise up. Waveform *d* is fed back to the OR gate 15 to maintain an output signal from OR gate 15 after the level of $c$ is dropped at the trailing edge of the delayed data pulse. The level of signal $d$ remains high until the level of signal $b$ drops at the occurrence of a data pulse. At this point the output from OR gate 15 is interrupted and is not resumed until the level of signal $c$ again goes high on the occurrence of a delayed data pulse. Signal $d$ is applied to OR gate 18 and is transmitted therethrough without change to control the oscillator 19. When the level of signal $e$ drops, the oscillator is turned off. When the level of signal $e$ again rises, the oscillator is turned on and then functions at a frequency of 2T. The oscillator is thus turned off by each data bit and turned back on by the delayed data bit. The output of the oscillator, signal $f$, is applied to the binary trigger 20 which performs a frequency division, so that the clock pulses of signal $g$ occur at the desired clock frequency T. Signal $e$ is applied through inverter 21 to the reset of the trigger, so that each time the oscillator is turned off, the trigger is reset. The result is that each time the oscillator is turned on the trigger starts in the same direction.

When it is desired to interrupt the reading process, the read gate signal is dropped, thus terminating the output from AND gate 16. At the same time, if it is desired to operate the clock to either write data in the file or to perform housekeeping functions in the processor, either the write gate or the clock run signal level is raised. This signal is passed through OR gate 18 and turns on the oscillator. The oscillator then free runs at a stable frequnecy to produce the desired sequence of clock signals.

While the invention has been particularly shown and described with reference to a preferred embodiment thereof, it will be understood by those skilled in the art that the foregoing and other changes in the form and details may be made therein without departing from the spirit and scope of the invention.

What is claimed is:

1. Means for generating a stable sequence of clock pulses in synchronism with a series of data pulses, including:

a clock circuit including an $L/C$ oscillator adapted to operate at a frequency of twice that of the desired clock pulse frequency;

delay means for delaying each data pulse a period equal to the oscillator period;

and means responsive to each data pulse and to each delayed data pulse for controlling the clock circuit, said last-named means including means to turn the clock circuit off with each data pulse and to turn the clock circuit on with each delayed data pulse.

2. Means for generating a stable sequence of clock pulses in synchronism with a series of data pulses as defined in claim 1, in which the clock circuit includes:

a binary trigger connected in series with the $L/C$ oscillator.

3. A clock circuit for generating a stable sequence of clock pulses in synchronism with a series of data pulses including:

an $L/C$ oscillator adapted to operate at a frequency of twice that of the desired clock pulse frequency;

delay means for delaying each data pulse a period at least equal to the oscillator period;

and means responsive to each data pulse and to each delayed data pulse for controlling the $L/C$ oscillator, said means including means to reset the oscillator with each data pulse and to set the oscillator on with each delayed data pulse.

4. A clock circuit as defined in claim 3 which includes a binary trigger connected in series with the $L/C$ oscillator.

References Cited

UNITED STATES PATENTS 3,238,462 3/1966 Ballard et al. -------- 328—63

ARTHUR GAUSS, *Primary Examiner.*

R. H. PLOTKIN, *Assistant Examiner.*